(12) United States Patent
Moore et al.

(10) Patent No.: US 8,307,329 B2
(45) Date of Patent: *Nov. 6, 2012

(54) IMPLICIT COMPOSITION OF COMPONENT BINDINGS

(75) Inventors: Anthony J. Moore, Seattle, WA (US); Christopher L. Anderson, Redmond, WA (US); Randy S. Kimmerly, Woodinville, WA (US); Clemens A. Szyperski, Redmond, WA (US); Donald F. Box, Bellevue, WA (US); Bradford H. Lovering, Clyde Hill, WA (US)

(73) Assignee: Microsoft Corporation, Redmond, WA (US)

( * ) Notice: Subject to any disclaimer, the term of this patent is extended or adjusted under 35 U.S.C. 154(b) by 1309 days.

This patent is subject to a terminal disclaimer.

(21) Appl. No.: 12/027,992

(22) Filed: Feb. 7, 2008

(65) Prior Publication Data

US 2009/0204941 A1   Aug. 13, 2009

(51) Int. Cl.
   *G06F 9/44*   (2006.01)
(52) U.S. Cl. ........ 717/107; 717/102; 717/106; 717/108; 717/111
(58) Field of Classification Search .................. 717/107, 717/102, 106, 108, 111
   See application file for complete search history.

(56) References Cited

U.S. PATENT DOCUMENTS

| | | | |
|---|---|---|---|
| 4,965,743 A | 10/1990 | Malin | |
| 5,675,805 A * | 10/1997 | Boldo et al. .................. | 717/114 |
| 5,680,619 A | 10/1997 | Gudmundson | |
| 5,850,548 A | 12/1998 | Williams | |
| 5,907,704 A | 5/1999 | Gudmundson | |
| 5,970,252 A | 10/1999 | Buxton | |
| 6,085,030 A * | 7/2000 | Whitehead et al. ........... | 709/203 |
| 6,088,739 A | 7/2000 | Pugh et al. | |
| 6,163,813 A * | 12/2000 | Jenney ......................... | 719/315 |
| 6,230,309 B1 | 5/2001 | Turner et al. | |
| 6,330,710 B1 | 12/2001 | O'Neil et al. | |
| 6,490,719 B1 | 12/2002 | Thomas | |
| 6,601,234 B1 | 7/2003 | Bowman-Amuah | |
| 7,076,784 B1 | 7/2006 | Russell et al. | |
| 7,155,713 B1 | 12/2006 | Burkhardt et al. | |
| 7,234,132 B2 | 6/2007 | Lam | |
| 7,246,350 B2 | 7/2007 | Vu | |
| 7,757,213 B2 | 7/2010 | Fusaro | |
| 8,108,831 B2 * | 1/2012 | Kimmerly et al. ............ | 717/107 |
| 2002/0049603 A1 * | 4/2002 | Mehra et al. ..................... | 705/1 |
| 2002/0120921 A1 | 8/2002 | Coburn | |
| 2004/0015812 A1 | 1/2004 | Sreedhar | |
| 2005/0149914 A1 | 7/2005 | Krapf | |
| 2005/0198100 A1 | 9/2005 | Goring et al. | |

(Continued)

OTHER PUBLICATIONS

Eckhardt Holz, "Application of UML within the Scope of new Telecommunication Architectures", 1997—Citeseer, total pp. 12.*

(Continued)

*Primary Examiner* — Don Wong
*Assistant Examiner* — Marina Lee
(74) *Attorney, Agent, or Firm* — Workman Nydegger

(57) ABSTRACT

Component domains used to define a binding between various components associated with the component domain. The component domain tracks the various services to be imported by each component, and tracks the various services exported by each component. At runtime, rather than at compile time, the various interrelations between the components are bound using the service import and export data. Accordingly, depending on the components available and their characteristics, the bindings may differ. This permits applications to be much more flexible.

16 Claims, 5 Drawing Sheets

U.S. PATENT DOCUMENTS

| | | | |
|---|---|---|---|
| 2005/0229186 | A1 | 10/2005 | Mitchell et al. |
| 2006/0010425 | A1 | 1/2006 | Willadsen et al. |
| 2006/0161888 | A1 | 7/2006 | Lovisa |
| 2006/0248451 | A1* | 11/2006 | Szyperski et al. ............ 715/513 |
| 2006/0277537 | A1 | 12/2006 | Chan et al. |
| 2007/0016575 | A1 | 1/2007 | Hurst-Hiller |
| 2007/0050756 | A1 | 3/2007 | Poller |
| 2007/0079282 | A1 | 4/2007 | Nachnani |
| 2007/0260633 | A1 | 11/2007 | Rapicault et al. |
| 2007/0294668 | A1 | 12/2007 | Mohindra et al. |
| 2008/0126474 | A1* | 5/2008 | Beisiegel et al. ............ 709/203 |
| 2008/0201690 | A1 | 8/2008 | Lovisa |
| 2009/0192847 | A1 | 7/2009 | Lipkin |
| 2009/0204942 | A1* | 8/2009 | Kimmerly et al. ............ 717/110 |

OTHER PUBLICATIONS

Cervantes et al. "Beanome: A Component Model for the OSGi Framework", 2002, retrieved from <http://148.206.49.174/papers/VIVIAN2002.pdf> total pp. 10.*

John Hutchinson et al., "A Service Model for Component-Based Development", IEEE, Aug. 8, 2004.

Notice of Allowance dated Oct. 13, 2011 cited in U.S. Appl. No. 12/027,990.

Turing Completeness Considered Harmful: Component Programming with a Simple Language (11 pages) http://lamp.epfl.ch/~mcdirmid/papers/mcdirmid06turing.pdf.

Development of embedded software with component integration based on ABCD architectures (8 pages) http://ieeexplore.ieee.org/iel5/10154/32462/01515375.pdf?tp=&arnumber=1515375&isnumber=32462.

Integration of Component-Based Development-Deployment Support for J2EE Middleware (2 pages) http://www.springerlink.com/content/l1gnyk1pa98464e6.

An Environment for Dynamic Component Composition for Efficient Co-Design (8 pages) http://citeseer.ist.psu.edu/cache/papers/cs/27024/http:zSzzSzwww.ics.uci.eduzSz~balboazSz.zSzpubszSzdoucet_date02.pdf/doucet02environment.pdf.

Recursive and Dynamic Software Composition with Sharing (9 pages) http://research.microsoft.com/~cszypers/Events/WCOP2002/04_Bruneton.pdf.

Composition Environments for Deployable Software Components (54 pages) http://www.ics.uci.edu/~andre/papers/T7.pdf.

Software Connectors and Their Role in Component Deployment (18 pages) http://dsrg.mff.cuni.cz/publications/DAIS01.pdf.

U.S. Appl. No. 12/027,990, filed Jul. 13, 2011, Office Action.

* cited by examiner

IMPLICIT COMPOSITION OF COMPONENT BINDINGS

BACKGROUND

Object-oriented programming structures software as a collection of object instances or "components", each patterned after a class that defines the methods and properties of the component. When referring to programming, "componentization" refers to the defining of the components such that they are made available to a program. Of course, components of a program are functionally interconnected in order to accomplish the larger purposes of the program. "Composition" refers to the defining of how objects in the program are related together.

Typically, the interrelation between objects is accomplished using code or declarations that define very specifically the relationship between components of a program. Great progress on the art of object-oriented programming has been made using such explicit composition of the interconnection between coded objects. In conventional explicit composition, for example, code that defines the composition of the program (i.e., the interrelation between components) is compiled after authoring the program using source code. The executable file thus from its birth represents the various components of the program and the various interrelations between the program components.

BRIEF SUMMARY

Embodiments described herein relate to the use of component domains to define a binding between various components associated with the component domain. The component domain tracks the various services to be imported by each component, and tracks the various services exported by each component. At runtime, rather than at compile time, the various interrelations between the components are bound using the service import and export data. Accordingly, depending on the components available and their characteristics, the bindings may differ. This permits applications to be much more flexible.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of embodiments described herein can be obtained, a more particular description of the invention briefly described above will be rendered by reference to specific embodiments which are illustrated in the appended drawings. Understanding that these drawings depict only example embodiments of the broader principles and are not therefore to be considered to be limiting of the scope of the invention, the embodiments will be described and explained with additional specificity and detail through the use of the accompanying drawings in which.

DETAILED DESCRIPTION

In accordance with embodiments described herein, component domains are used to create a binding between various components in the component domain. The component domain tracks the various services to be imported by each component, and tracks the various services exported by each component. At runtime, rather than at compile time, the various interrelations between the components are bound using the service import and export data. Accordingly, depending on the components available and their characteristics, the bindings may differ. This permits applications to be much more flexible.

First, after some introductory discussion regarding computing systems in general, a basic computing system will be described with respect to FIG. 1. Then, various embodiments of a component domain with component domain logic and various embodiments of its operation will be shown and described with respect to FIGS. 2 through 6.

Computing systems are now increasingly taking a wide variety of forms. Computing systems may, for example, be handheld devices, appliances, laptop computers, desktop computers, mainframes, distributed computing systems, or even devices that have not been conventionally considered a computing system. In this description and in the claims, the term "computing system" is defined broadly as including any device or system (or combination thereof) that includes at least one processor, and a memory capable of having thereon computer-executable instructions that may be executed by the processor. The memory may take any form and may depend on the nature and form of the computing system. A computing system may be distributed over a network environment and may include multiple constituent computing systems.

Figure 1:
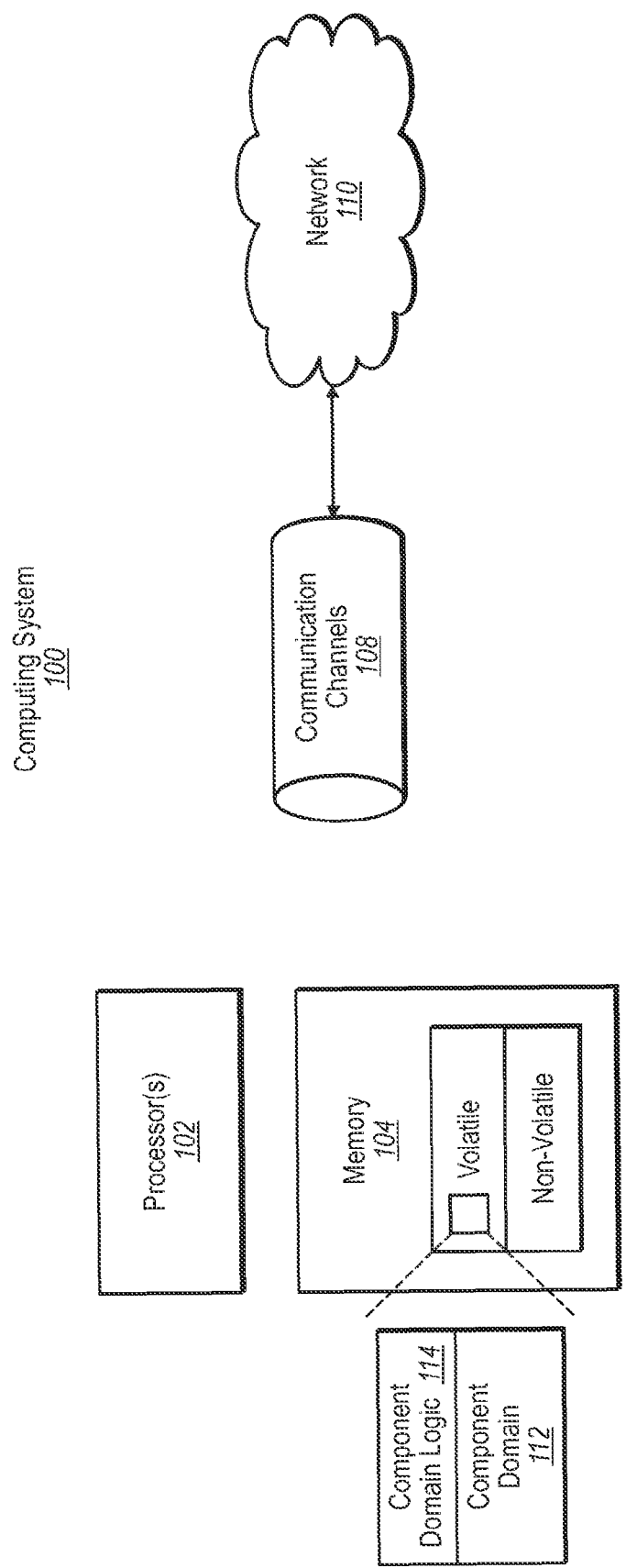
FIG. 1 illustrates an example computing system that may operate a component domain.

Referring to FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100.

Computing system 100 may also contain communication channels 108 that allow the computing system 100 to communicate with other computing systems over, for example, network 110. Communication channels 108 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

In FIG. 1, the computing system 100 is shown with a component domain 112 within the volatile portion of the memory 104. As will be described in further detail with respect to FIG. 2 and subsequent figures, the component domain 112 is used as a logical container into which to instantiate various components. The component domain logic 114 then dynamically binds the various components, rather than having the components bound at compile time.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Figure 2:
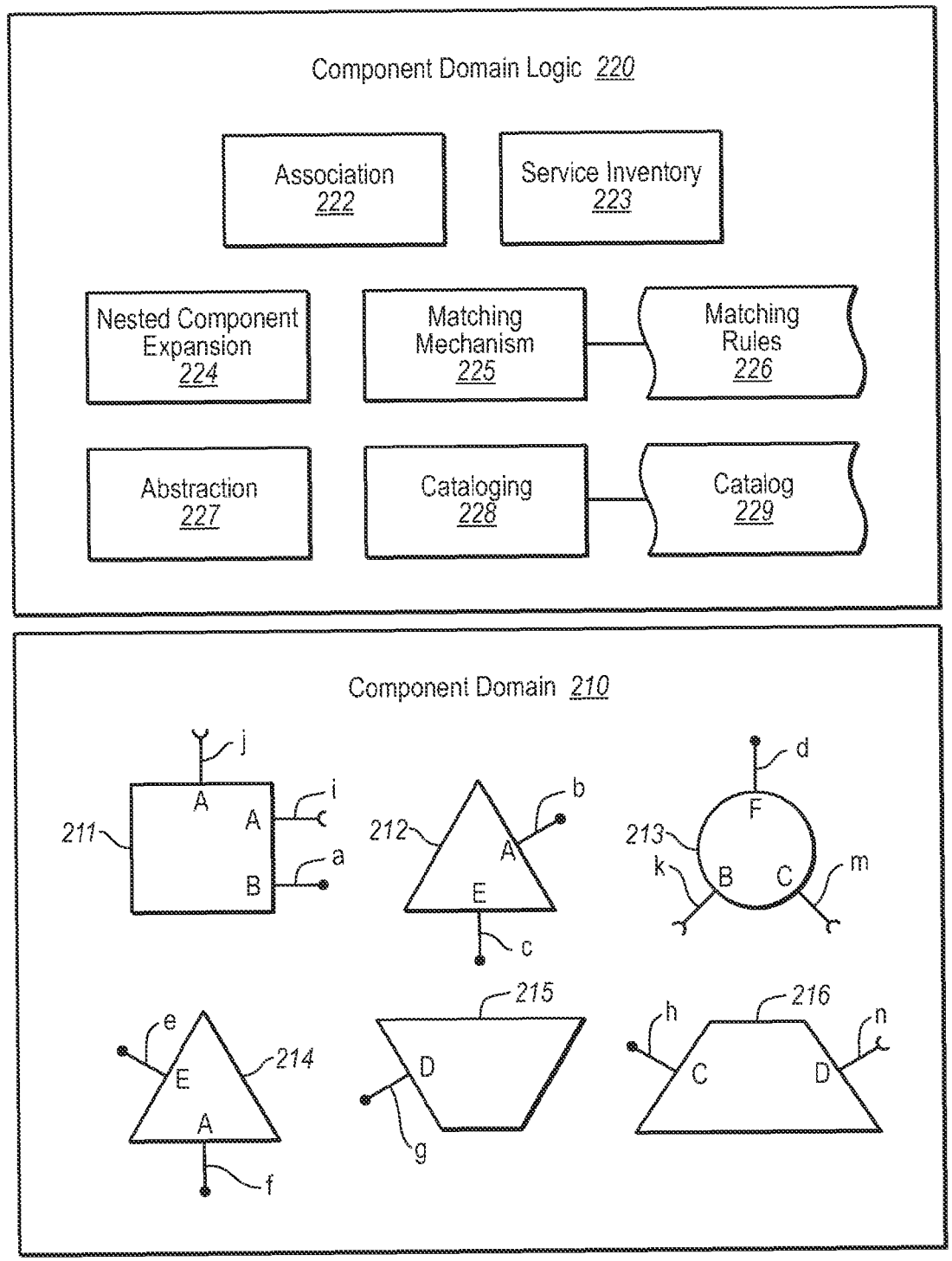
FIG. 2 illustrates an example architecture of a component domain with its associated logic and components contained within the component domain.

FIG. 2 illustrates a component domain 210 and an associated component domain manager labeled as "component domain logic" 220. The component domain 210 of FIG. 2 may be, for example, the component domain 112 of FIG. 1. The component domain 210 may be any logical container that may contain component instances. The flexibility in the component domain 210 allows the component domain to contain a variety of component instances of a variety of classes. The types of components included within the component domain 210 will depend on the application, and the building blocks used by that application. Accordingly, the principles of the present invention are not limited to the types of components included within the component domain 210, nor the number of components within the component domain. Nevertheless, for illustrative purposes, six components 211, 212, 213, 214, 215 and 216 are illustrated as being contained within the component domain 210.

The component domain 210 may be any logical container that is capable of literally or logically containing other components. For example, the component domain 210 may be an instance of a container class capable of receiving various component instances, with the collection of component instances being a data structure. The component domain 210 may also be an object that does not directly contain each component instance, but perhaps has information regarding associated components. Even in that case, the components may be considered as logically within the component domain 210. For instance, in one embodiment, the component domain includes only a group of values, perhaps a group of name-value pairs. The component domain receives a value from components that export the service, and the component that imports that service receives the value. Still, even in that context, the components may be considered to be logically inside or within the component domain. In this description and in the claims, when components are referred to as being "within" or "inside" the component domain, that means that the components are either contained within the component domain, or are somehow logically associated with the component domain in a manner that the component domain logic 220 is capable of communicating with and binding the various components associated with the component domain.

The component domain logic 220 is illustrated as including various mechanisms including, for example, an association mechanism 222, a service inventory mechanism 223, a nested component expansion mechanism 224, a matching mechanism 225 having associated matching rules 226, an abstraction mechanism 227, and a cataloging mechanism 228 having an associated catalog 229. These various mechanisms 222 through 229 are shown as separate mechanisms. However, this is for purposes of clarity in explaining the functionality of the component domain logic 220. It is not used to represent that they are actually separate mechanisms. Some of the mechanisms may be combined into a single component. In fact, all of the component domain logic may be monolithic. On the other extreme, each mechanism may be composed of multiple components. A single component may also include logic that contributes to multiple mechanisms. The operation of the various component domain logic 220 mechanisms will be described shortly.

First, however, this description refers back to the various constituent components instantiated within the component domain 210. In the illustrated example, the constituent components include components 211 through 216. Each component is an instance of a particular class. To symbolically illustrate this principle, each component is illustrated as a particular shape. For instance, in the example, the component 211 is illustrated as a square. Components 212 and 214 are illustrated as triangles indicating that they are each instances of the same class, which is not the same class as the component 211. The component 213 is illustrated as a circle symbolizing that it is an instance of a class that is different than components 211 and 212. The component 215 is illustrated as a top-heavy parallelogram symbolizing that it is an instance of a class that is different than components 211 through 214. Lastly, the component 216 is illustrated as a bottom-heavy parallelogram symbolizing it is an instance of a class that is different than components 211 through 215.

Each component includes potentially one or more service imports, and potentially one or more service exports. A "service import" with respect to a component is an indication that the component is requesting a service. A "service export"

with respect to a component is an indication that a component is offering to provide a service. Service imports and exports are each symbolically represented in FIG. 2 by an arm extending from the corresponding component. Service imports are represented by an arm that has a cup form at its end. Service exports are represented by an arm that has a ball form at its end. In the configuration of FIG. 2, all of the components 211-216 are instantiated within the component domain 210. However, none of the components are connected together. The manner in which the component is to be connected is furthermore not explicitly specified in advance of runtime. Instead, the service imports and exports are specified. The various services' imports and exports are for various services represented abstractly using letters A through F in FIG. 2.

For instance, component 211 has one service export for service B as represented by arm a; and two service imports, one for service A as represented by arm i, and yet another for service A as represented by arm j. Component 212 has two service exports, one for service A as represented by arm b, and one for service E as represented by arm c. Component 212 has no service imports. Component 213 has one service export for service F as represented by arm d; and two service imports, one for service B as represented by arm k, and another for service C as represented by arm m. Component 214 is of the same class as component 212. In one embodiment, the type of service imports and service exports are defined by the class. Accordingly, component 214 is like component 212, in that it has no service imports, and two service exports, one for service A as represented by arm f, and one for service E as represented by arm e. Component 215 has no service imports and one service export, which is for service D as represented by arm g. Component 216 has one service import for service D as represented by arm n, and one service export for service C as represented by arm h.

The component domain 210 shows the various components 211 through 216 prior to the composition of the components. "Composition" refers to the defining of how the various components are to be interconnected. Ultimately, the components in the component domain 210 will have their interconnections defined. However, this was not done prior to running the application represented by the various components in the component domain 210. Rather, the component domain logic 220 will define the connections between the various components at runtime.

Figure 3:
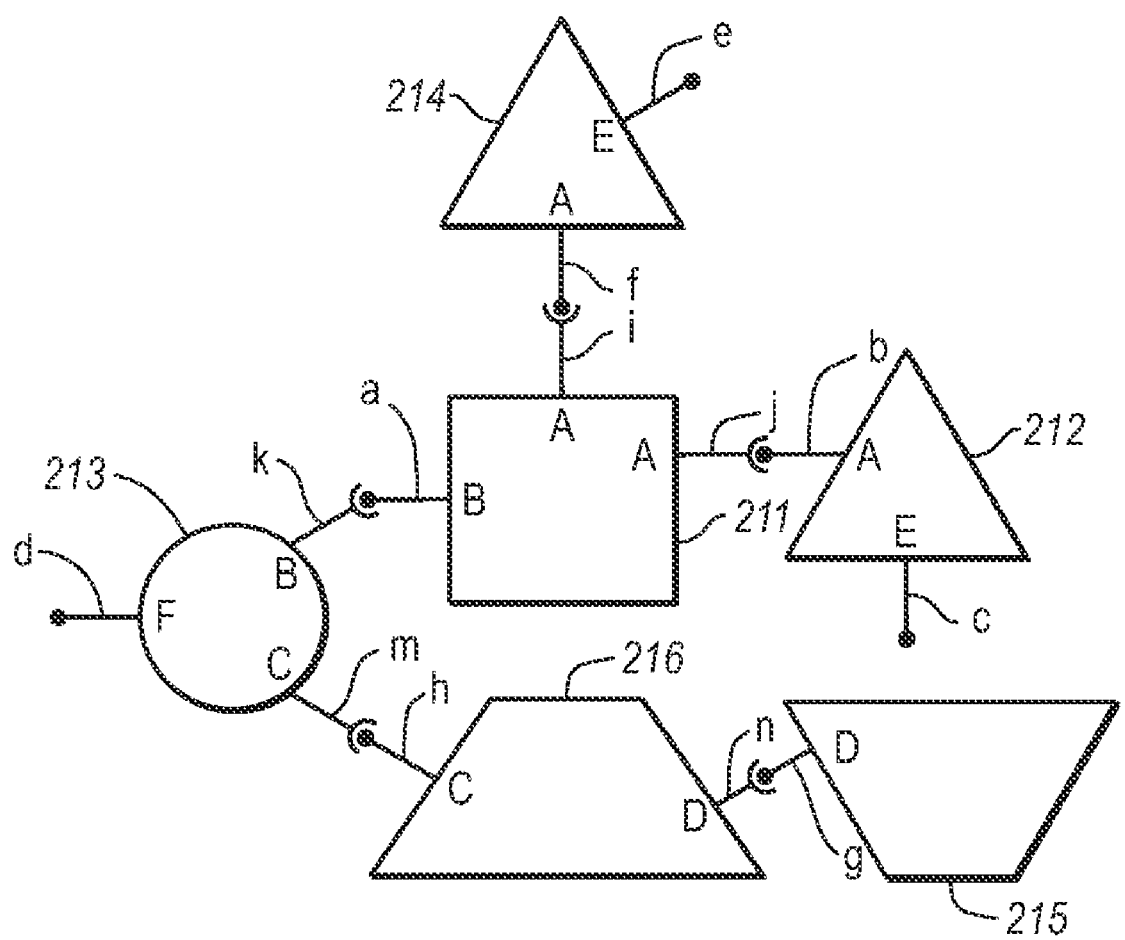
FIG. 3 illustrates an example of the various components in the component domain after being bound.

FIG. 3 illustrates the various components 211 through 216 after composition. In one particular matching operation, the service exports for a particular service are to be coupled with a service import for the same particular service. In FIG. 3, the service export for service A of the component 212 is connected to the service import for service A of the component 211 (as represented by the arm b meeting with the arm j). This represents that component 212 provides service A to component 211 using the relevant interface. The same symbolism applies to the other connections between service imports and exports illustrated in FIG. 3 with respect to their respective service. For example, the following arm pairs are shown connected, arms j and i for service A, arms a and k for service B, arms h and m for service C, and arms g and n for service D. The service export for service E of the component 212 (represented by arm c) is not connected to any service import, representing that this service export is latent. The same symbolism applies to the arms d and e.

Although the connections between components are not defined ahead of time, the service exports and imports for the components are indicated. It does not matter where or how the service exports and imports are specified. However, one possible location may be in the class definition itself. For example, consider the following class definition for a class called "Consumer" written in C# code:

```
class Consumer
{
    [Import ("Consumer Report")]
    IReport MyReport {get; set;}
    .
    .
    .
}
```

In square brackets, the class Consumer declares that it imports a service called "Consumer Report". The content of square brackets does not affect the functionality of the compiled object in C#. Rather, the contents are written to the compiled class as metadata that accompanies a compiled type or member that describes it in a way that is not part of its default execution, but can be inspected and acted on from the outside. In this example, when an object of a class is to be instantiated, the class definition, either in its pre-compiled or post-compiled form, may be referred to in order to identify the service import for a particular object following that class.

In one example matching between service imports and service exports, the service name is to exactly match, although other matching rules are conceivable. The following represents a class definition represented in C# in which the class exports a service called "Consumer Report":

```
class ReportEnvelope
{
    [Export ("Consumer Report")]
    IReport Content {get; set}
    .
    .
    .
}
```

Here, the metadata expression in the brackets declares that the class ReportEnvelope exports a "Consumer Report" service. For instance, when an object of the ReportEnvelope class is connected with the object of the Consumer class, the Consumer object may get reports from the ReportEnvelope object.

In this example, the class itself, whether compiled or pre-compiled, may be referred to in order to determine the service exports and service imports for a particular object. In another embodiment, the object may be configured to offer an interface that the component domain logic may use to ask the various objects for the service import and export identifications.

The various mechanisms 222-229 of the component domain manager 220 will now be described in detail. Once again, these mechanisms are divided by function, and do not represent any actual object boundaries in the component domain manager 220. As will be mentioned below, some of the various mechanisms 222-229 may occasionally use an instantiation mechanism that is often provided by the underlying runtime provided in the system. The instantiation mechanism has the capability to use a class definition to instantiate a component that follows that class.

An association module 222 is capable of associating instantiated components with the component domain 210. For instance, in FIG. 2, components 211 through 216 are shown associated within the component domain 210, symbolizing that they are not just instantiated, but they are instantiated in such a way that they are associated with the component domain 210. The components associated with the component domain 210 will be subjected to a particular binding processing at runtime. The association of the components with the component domain may be done at the time of instantiation of each component, or sometime thereafter.

A service inventory mechanism 223 indexes services exported and imported by the components associated with the component domain. The service inventory mechanism 223 may have a mechanism for discovering those services. For example, in one embodiment, when a component of a particular class is instantiated, the service inventory mechanism 223 may access a class definition to evaluate the service(s) imported or exported. In another embodiment, the components may be drafted so as to respond to discovery requests. For example, the components may offer an Application Program Interface that serves to notify querying entities of the service(s) that it exports and imports. Alternatively, the component may be drafted to write its service imports and exports to a particular location immediately upon instantiation.

For instance, referring to FIG. 2, the service inventory mechanism may conceptually maintain the following Table 1:

TABLE 1

| Component Identifier | Services Exported | Services Imported |
|---|---|---|
| 211 | B | A, A |
| 212 | A, E | |
| 213 | F | B, C |
| 214 | A, E | |
| 215 | D | |
| 216 | C | D |

The service inventory mechanism 223 need not represent information as a table, but a table is a useful illustration to show the reader the type of information that may be maintained. Furthermore, the service inventory mechanism 223 may not know all of the services exported or imported by a particular component.

Figure 4:
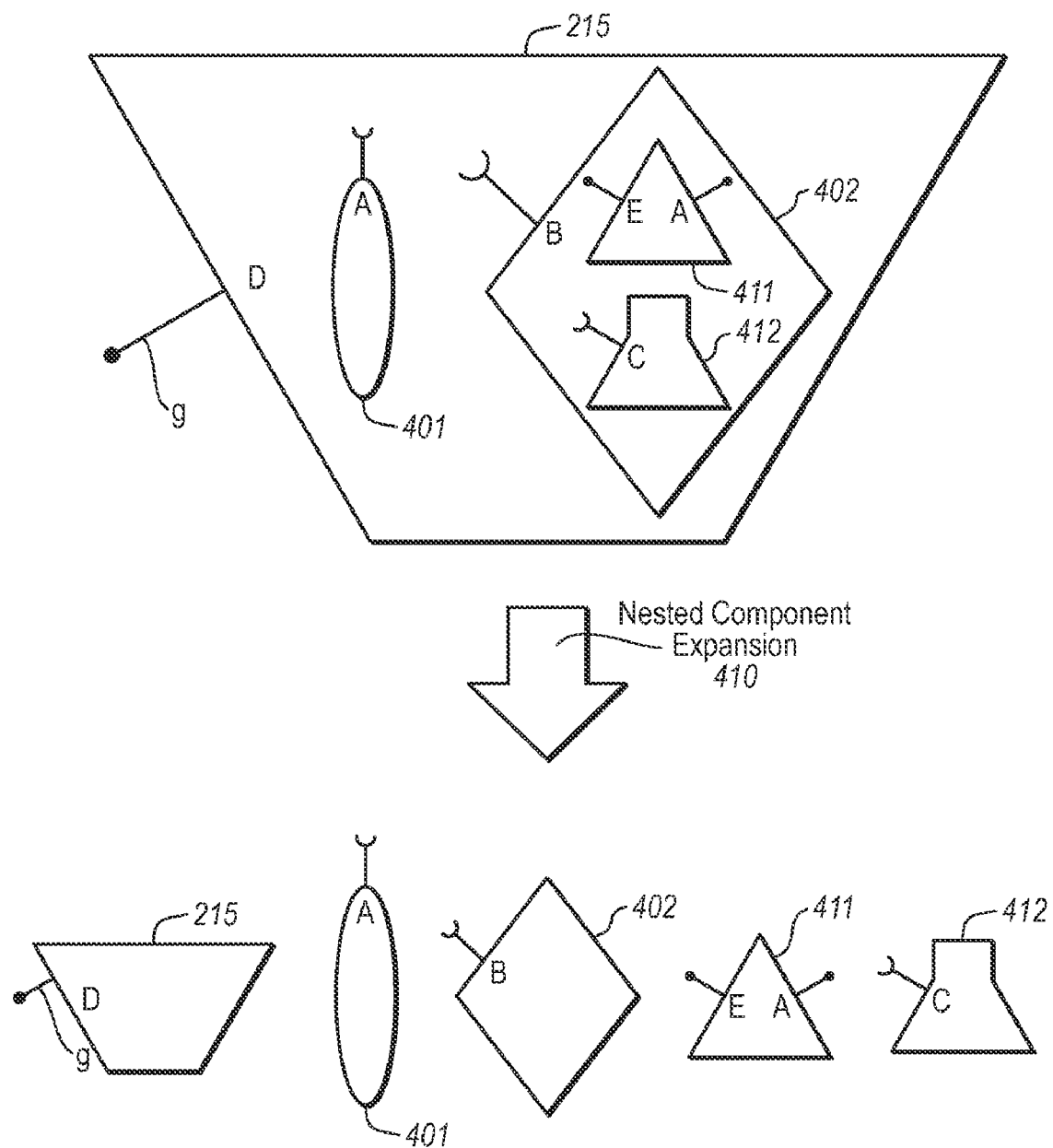
FIG. 4 illustrates a process flow associated with nested component expansion.

A nested component expansion mechanism 224 evaluates whether a component in the component domain has nested components therein. For example, FIG. 4 represents that one of the components (i.e., component 215) of FIG. 2 includes a hierarchy of nested components prior to expansion represented by arrow 410. In particular, the component 215 in FIG. 4 includes two child components 401 and 402 prior to expansion. One of those child components 402 includes their own child components 411 and 412 prior to expansion.

The nested component expansion mechanism 224 is configured to discover nested components, and expand them such that services exported and imported by nested components are also made visible to the binding operation. For example, after expansion 410, the various nested components 401, 402, 411 and 412 are shown with their various services exported (services A and E in the case of component 411) shown as visible for binding. Additionally, the various services imported (service A for component 401, service B for component 402, and service C for component 412) are shown as visible for binding. Thus, after expansion, these nested components are recognized by the service inventory mechanism 223.

A matching mechanism 225 actually responds to a request to bind the components. In order to do that, the matching mechanism 225 follows a set of matching rules 226. The matching mechanism 225 follows the matching rules 226 in order to match up and bind service imports to service exports.

For example, in FIG. 3, the various components in the component domain 210 are shown bound together.

The matching rules may be a default implicit set of matching rules, or there may be other matching rules that override the default matching rules. For instance, perhaps, by default, matching of a service import to a service export is made by finding an exact service name match. For instance, in the class definition examples set forth above, the class "Consumer" has a service import called "Consumer Report". On the other hand, the class "ReportEnvelope" has a service export by the same exact name "Consumer Report". In accordance with the exact service name matching rules, therefore, a service export of an instance of ReportEnvelope may be bound to a service import of an instance of Consumer.

However, other service matching rules may be applied. For instance, case may be ignored in some matching rules. In other rules, there may be clusters of service names that may be deemed to match each other. For instance, there might be a service name in Italian, a service name in French, and so forth, which may each be deemed to match. In accordance with another set of matching rules, if a service import or export is not specified by name, the matching mechanism 225 may actually structurally evaluate member names, types and parameters of the service import, against member names, types and parameters of the service export.

The service matching mechanism 225 may also take steps to not just logically match components, but may also at least contribute to the actual functional binding of the service import and export. In one embodiment, once the service matching mechanism 225 finds a match, the service matching mechanism 225 may acquire the requested service from the service exporting component, and provide that service to the service importing component.

In another embodiment, the service matching mechanism 225 may provide a handle data structure to the service importing component. The service importing mechanism may then use that handle to complete the binding with the service exporting mechanism. The service matching mechanism may optionally allow the service importing mechanism to accept or reject the match. For instance, the service importing component may notify the service matching mechanism if the match is acceptable, following which the actual binding is to occur. If the service is not deemed acceptable, perhaps the service matching mechanism finds a backup match, and so forth, until an acceptable match is found and accepted by the service importing component.

For example, the handle data structure might include a factory that the service importing component might use to perform the binding operation between its import and the export proffered by the matching component. The handle might also include metadata (called hereinafter "selection metadata") that contains information that the service importing component might use to determine whether or not to trigger the factory to perform the binding. In one embodiment, the service importing component might not use the selection metadata, but may instead use the factory to automatically accept the binding. However, the service importing component may alternatively use the selection metadata to evaluate whether the proposed export will be acceptable to the service importing component. If the service importing component elects to accept the binding, then the service importing component may use the factory to trigger the system to complete the binding.

In other cases, there might be multiple possible matches of service exports to a particular service import. In that case, the handle might include a factory and selection metadata for each potential service export. The service importing component may then use the metadata to select none or perhaps a subset of the service exports for importing. The service importing component may then use the corresponding factories of the selected service exports to complete the binding with each of the selected service exports.

For example, suppose a Consumer component is to import a service named "Consumer Report" as in the example above. If there were multiple components that offered the service named "Consumer Report", the Consumer component may be given factories and selection metadata for each potential service export match. The selection metadata might include, for example, 1) the date that the Consumer Report was generated, and 2) an identification of a product class that the Consumer Report is regarding. If the Consumer component was interested in only one service export named "Consumer Report", the Consumer component might use the selection metadata to identify a Consumer Report service export that was generated recently, and which indicates a product class that was most relevant to the Consumer component.

In some cases, there may be no components within the component domain that offer a service export that matches a particular service import. In such a case, the binding may still be potentially performed. There will now be described a number of ways of handling the case where a bind cannot be initially performed for a particular service import.

In one case, the service import may have associated with it an "importance" property or the like, which specifies how urgent it is to the functionality of the overall application that the service import be satisfied. If the importance is high, then a service export should be found somewhere. However, if the importance is low, then perhaps the application can get by without binding the service import at all. There may be a variety of intermediary importance levels, which may govern to what extent the binding operation is to go to try to find a service export.

In one embodiment, if a service export for a particular service import is not found within the component domain, an abstraction mechanism 227 may perhaps find another component from another component domain. Therefore, there may be many component domains running on a single computing system, or that may be accessible over a network by the computing system. In that case, the abstraction mechanism 227 may consult the service inventory mechanism (or perhaps the cataloging mechanism 228) for those other component domains until a component is found that offers the service export corresponding to the service import to be bound. In one embodiment, the abstraction mechanism 227 may simulate itself as a component that offers the service export. The service import may be thus bound to the abstraction mechanism 227 itself When the service importing component makes a call to the abstraction mechanism 227 for the service, the abstraction mechanism 227 may interface with that external component to perform the requested service.

In one embodiment, the component domain may be associated with a number of related component domains. The abstraction mechanism 227 may search out all of those related component domains for the appropriate service exports. In other embodiments, the abstraction mechanism 227 may search out only some of the related component domains. For instance, if the component domain 210 was a node in a hierarchical tree of component domains, perhaps the abstraction mechanism 227 may search only the component domains representing nodes in the ancestral line, rather than searching cousin component domains. The abstraction component 227 may thus abstract service exports for a number of different service exports, while performing the underlying processing necessary to interface with the various external components to thereby perform the service.

Alternatively, or in addition, if a service import cannot be satisfied by an already instantiated component within the component domain, a cataloging mechanism 228 may use a catalog 229 to find components that are not presently instantiated that offer a particular service export. For instance, the catalog 229 may contain a variety of class definitions, each having metadata that describes the services exported by objects of that class. Based on the evaluation of the associated metadata, the cataloging mechanism 228 may find a particular class definition that offers the needed service export. The cataloging mechanism 228 may then select the component of that class to be instantiated within the component domain 210. Alternatively, the component importing the service may be provided with the metadata that describes the service exported by the cataloged class, so that the importing component can make its own decision regarding whether the service exported will be satisfactory. If it is satisfactory, the component importing the service may cause a component of the class to be instantiated. For instance, the component importing the service may also have been provided with the ability to access a factory that allows the component exporting the service to be instantiated.

Having described the various functionality of the component domain logic 220 of FIG. 2, various processes will now be described with respect to FIGS. 5 and 6.

Figure 5:
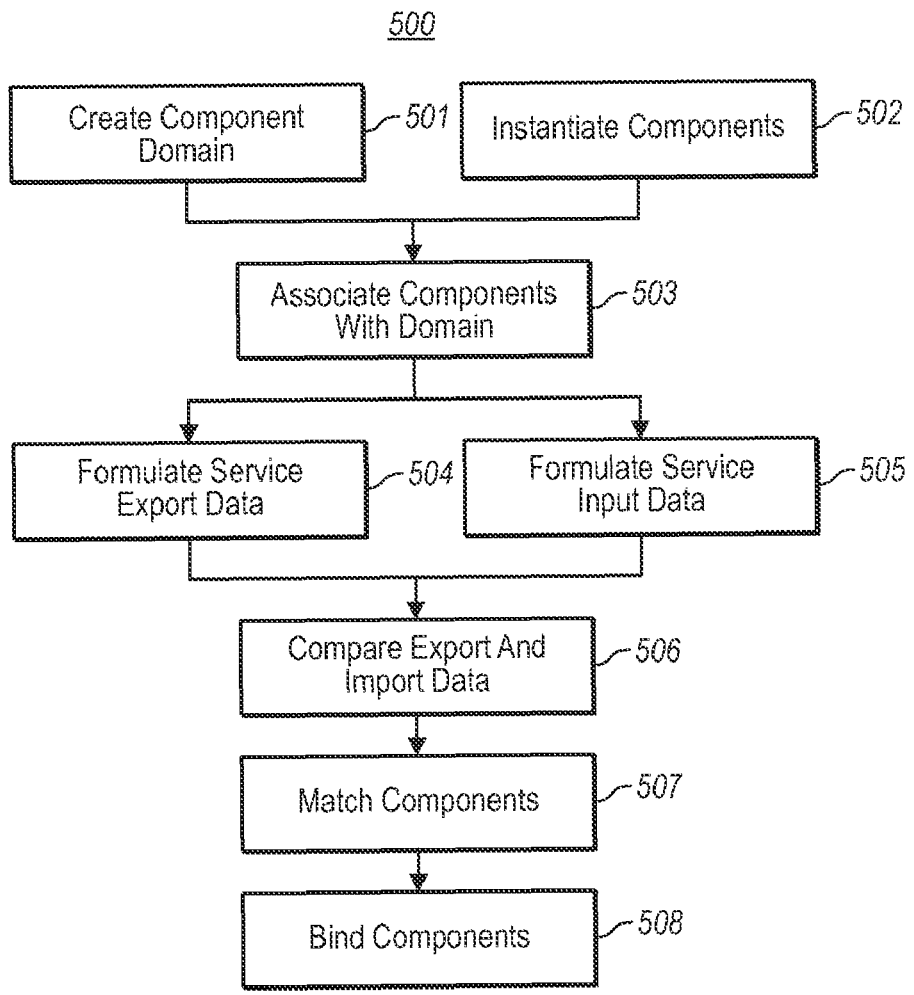
FIG. 5 illustrates a flowchart of a method for binding components in the component domain.
Figure 6:
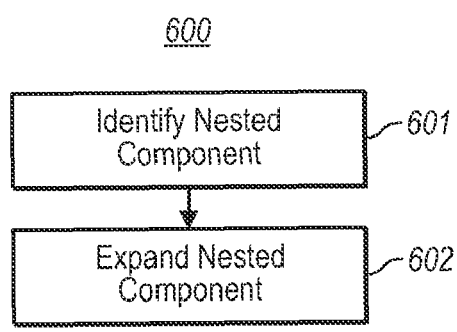
FIG. 6 illustrates a flowchart of a method for expanding nested components.

FIG. 5 illustrates a flowchart of a method 500 for composing components of a program. A component domain is first created (act 501). For instance, referring to FIG. 2, the component domain 210 may be created, with some of all of the accompanying component domain logic 220. In addition, the components of the program are instantiated (act 502). At least some of the components of the program are also associated with the component domain (act 503). For instance, referring to FIG. 2, the components 211 through 216 may be some or all of the components of a program.

Next, service export data is formulated (act 504), and also service import data is formulated (act 505). The service export data identifies, for each component, any corresponding service(s) exported by that component. Similarly, the service import data identifies, for each component, any corresponding service(s) imported by that component. An example of consolidated export and import data is represented above in Table 1.

The import data may also identify some further information regarding the import. For example, the import may indicate that it wants a) exact one export to bind to b) wants at most one export to bind to c) any number (one or more) of exports to bind to d) any number (zero or more) of exports to bind to, d) wants some other range (e.g., between two and five, inclusive) or e) wants some other specific number of exports (e.g., three exports). This import data may be taken into consideration when deciding whether or not a particular binding to one or more exports is satisfactory.

Once the service export and import data is available, the service export data is compared with the service import data (act 506). Based on this comparison, appropriate service exports may be matched with corresponding service imports (act 507). Once again, this matching may be performed using matching rules. The matched service exports and imports may then be bound (act 508).

If there are multiple service exports that can satisfy a particular service import, and multiple exports are acceptable to the service import, then all of the service exports and they are made available to the service import as a collection of service exports. There is also a case in which there might be more service exports that can satisfy a service import than the service import wants. For example, perhaps there are multiple service exports that might satisfy a service import that has indicated that it wants only one or no more than one service export. Alternatively, perhaps there are 10 service exports available for a service import that has designated that it wants no more than 4 service exports. In that case conflict resolution is used to identify how to handle these cases.

One optional conflict resolution step is to simply have the composition process fail if there are more service exports than the service import wants. In that case, an exception report may give some guidance as to the reason for the failure to complete the composition process. Another option would be to have rules for designating the acceptability of a particular match, and have the more acceptable service export(s) matched with the service import such that the appropriate number of service exports are bound with the service import. If there were no matching service exports, then the service import might also specify whether or not an empty match would be acceptable. This might depend on the importance of functionality enabled by the importation of the service.

Once again, the components within the component domain may be expanded forms of nested components within other component in the component domain, as explained above with respect to FIG. 4. FIG. 6 illustrates a flowchart of a method 600 for expanding such nested components. Upon determining that one of the components in the component domain is a nested component (act 601), the nested component is expanded (act 602) such that the nested component is included as one of the components associated with the component domain, and such that the formulated service import data includes at an identification of at least one service imported or exported by the nested component, or at least one further nested component contained within it.

In one embodiment, as mentioned above, the component domain logic may refer to a catalog in order to complete the matching. The catalog includes an identification (e.g., a class definition) of at least some components that may be instantiated, as well as a list of services offered by components of that class. When matching, a service import of a component within the component domain may be matched with a service export of a class provided through the catalog. As explained previously, in order to satisfy a service import, the component domain logic may also abstract the service export offered by a component outside of the component domain (e.g., in another related component domain).

In the process of matching and binding, new components may be instantiated within the component domain in order to satisfy existing components in the component domain. Furthermore, as service imports become bound to service exports, the components importing the services may make available new service exports, and may expose new service imports. Accordingly, the process of FIG. 5 may iterate one or more times further until all critical service imports are bound to corresponding service exports, thereby enabling the full composition of the components within the program.

This composition of components was performed at runtime, not at compile time, and was based on a loose identification of a service import and export. This allows for new components to be added, and for old components to be modified, and added to the system after the time of shipment. For instance, a catalog may be updated when new components become available for a particular program. When the program next runs, the components offering a particular service may be acquired from a remote location such as, for example, over a network from a program vendor.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising one or more physical computer-readable storage devices having stored thereon computer-executable instructions that, when executed by one or more processors of a computing system, cause the computing system to perform a method for composing a plurality of components of a program, and wherein the method is comprised of the following acts:
    creating a component domain in which to associate instantiated components;
    creating a component domain manager which contains logic mechanisms used to dynamically bind components contained in the component domain at runtime based on matching service imports and service exports of the components that are instantiated and associated with the component domain at runtime, and using the logic mechanisms, the component domain manager performing the follow at runtime:
    associating a plurality of instantiated components with said component domain;
    identifying and indexing those services exported and those services imported by each of the instantiated components of the component domain; and
    comparing at runtime service export data with service import data and then identifying as matching at least a first component that exports a particular service, and at least a second component that imports the particular service, and then binding the first component to the second component for the particular service so that the first component makes the particular service available to the second component at runtime.

2. A computer program product in accordance with claim 1, wherein the act of matching is performed using matching rules.

3. A computer program product in accordance with claim 2, wherein the matching rules indicate that a match is found using at least a criteria of whether a service name specified in import metadata of the first component that imports the service matches a service name specified in export metadata of the second component that exports the service.

4. A computer program product in accordance with claim 1, the method further comprising:
    an act of determining that one of the plurality of instantiated components contains a nested component; and
    an act of expanding the nested component such that the nested component is included as one of the components associated with the component domain, and such that the formulated service import data includes at least an identification of at least one service imported by the nested component.

5. A computer program product in accordance with claim 1, the method further comprising:
    an act of determining that one of the plurality of instantiated components contains a nested component; and
    an act of expanding the nested component such that the nested component is included as one of the components associated with the component domain, and such that the formulated service export data includes at least an identification of at least one service exported by the nested component.

6. The computer program product in accordance with claim 1, wherein the act of binding comprises:
   an act of acquiring an object from the first component that exports the particular service; and
   an act of providing the object to the second component that imports the particular service.

7. The computer program product in accordance with claim 1, wherein the act of binding comprises:
   an act of acquiring metadata from the first component that exports the particular service, the metadata identifying the particular service exported by the first component;
   an act of providing to the second component that imports the particular service an ability to cause the first component that exports the particular service to be instantiated.

8. A computer program product in accordance with claim 1, wherein the method further comprises:
   an act of formulating a catalog that includes a plurality of class definitions as well as an inventory of services exported by the cataloged components.

9. A computer program product in accordance with claim 8, wherein the act of matching comprises an act of matching at least one component within the component domain with a catalogued component.

10. A computer program product in accordance with claim 9, further comprising:
    an act of binding the at least one component within the component domain with the cataloged component.

11. A computer program product in accordance with claim 9, further comprising:
    an act of binding the at least on component within the component domain to an abstraction of the cataloged component.

12. A computer program product in accordance with claim 9, wherein the cataloged component is a component from another component domain.

13. A computer program product in accordance with claim 9, wherein the cataloged component is a component from persistent storage.

14. A computer program product in accordance with claim 9, wherein the cataloged component is a component available over a network to the computing system.

15. A computer program product comprising one or more physical computer-readable storage devices having stored thereon computer-executable instructions that, when executed by one or more processors of a computing system, cause the computing system to perform a method for composing a plurality of components of a program, and wherein the method is comprised of the following acts:
    creating a component domain within a non-volatile portion of computer system memory, the component domain serving as a logical container in which to instantiate various components;
    creating a component domain manager which contains logic mechanisms used to dynamically bind components contained in the component domain at runtime based on matching service imports and service exports of the components that are instantiated and contained in the component domain at runtime, and wherein the logic mechanisms comprise:
    an association mechanism that associates the plurality of instantiated components with said component domain;
    a service inventory mechanism that identifies and indexes at runtime those services exported and those services imported by each of the instantiated components of the component domain; and
    a matching mechanism that compares at runtime service export data with service import data and identifies at least a first component that exports a particular service, and at least a second component that imports the particular service, and then binds the first component to the second component for the particular service so that the first component makes the particular service available to the second component at runtime.

16. A computer program product comprising one or more physical computer-readable storage devices having stored thereon computer-executable instructions that, when executed by one or more processors of a computing system, cause the computing system to perform a method for composing a plurality of components of a program, and wherein the method is comprised of the following acts:
    creating a component domain within a non-volatile portion of computer system memory, the component domain serving as a logical container in which to instantiate various components;
    creating a component domain manager which contains logic mechanisms used to dynamically bind components contained in the component domain at runtime based on matching service imports and service exports of the components that are instantiated and contained in the component domain at runtime, and wherein the logic mechanisms comprise:
    an association mechanism that associates the plurality of instantiated components with said component domain at runtime;
    a service inventory mechanism that identifies and indexes at runtime those services exported and those services imported by each of the instantiated components of the component domain; and
    a matching mechanism that uses a set of matching rules to compare at runtime service export data with service import data and to then identify at least a first component that exports a particular service, and at least a second component that imports the particular service, and then binds the first component to the second component for the particular service so that the first component makes the particular service available to the second component at runtime.

* * * * *